April 14, 1970 R. HARMSTORF 3,505,826
APPARATUS FOR EMBEDDING A PIPELINE INTO A WATER BED
Filed Feb. 28, 1968 4 Sheets-Sheet 3
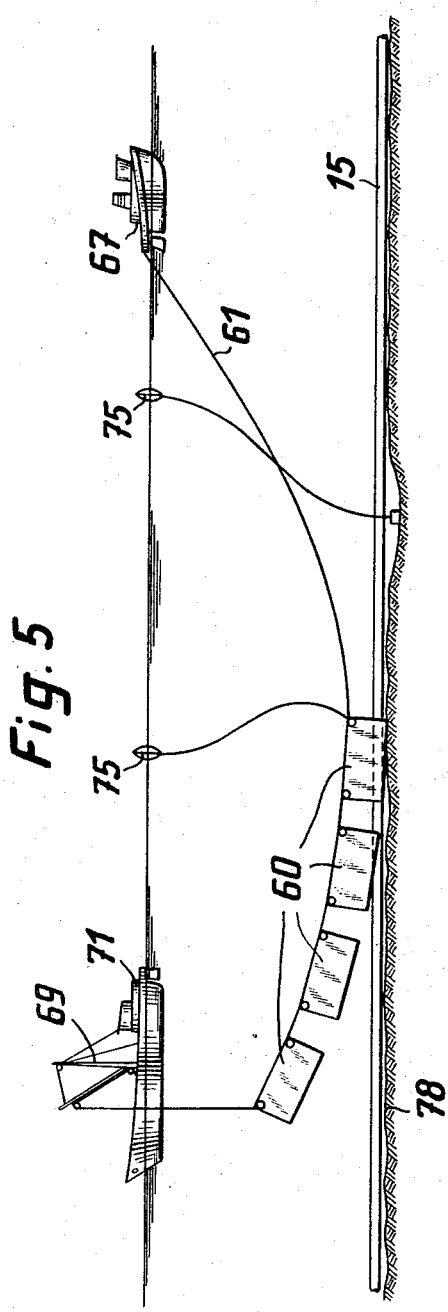
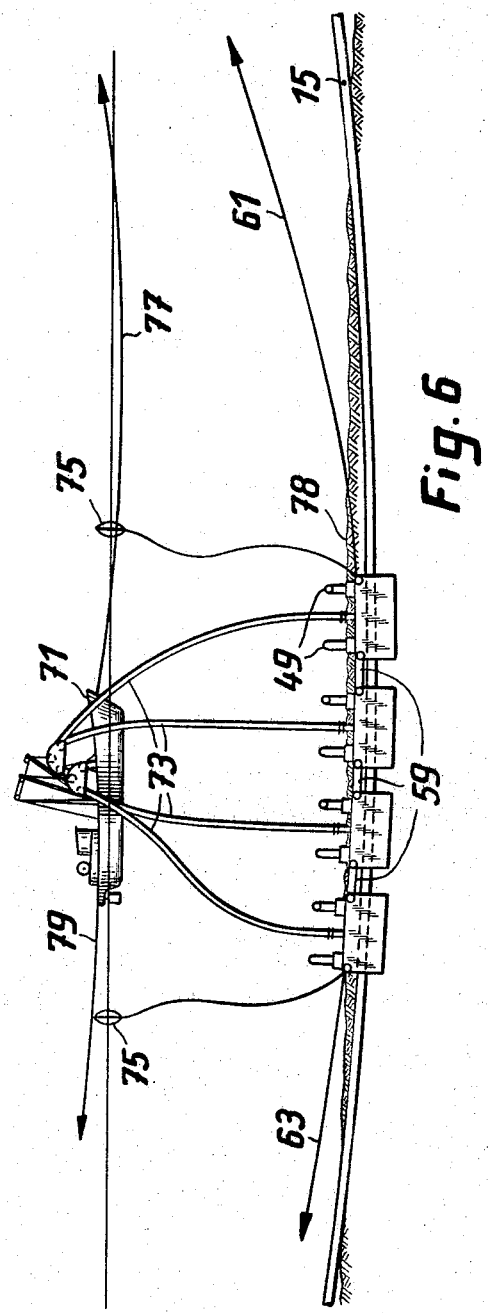
INVENTOR.
Rudolf Harmstorf
BY
Beaman & Beaman
Attys

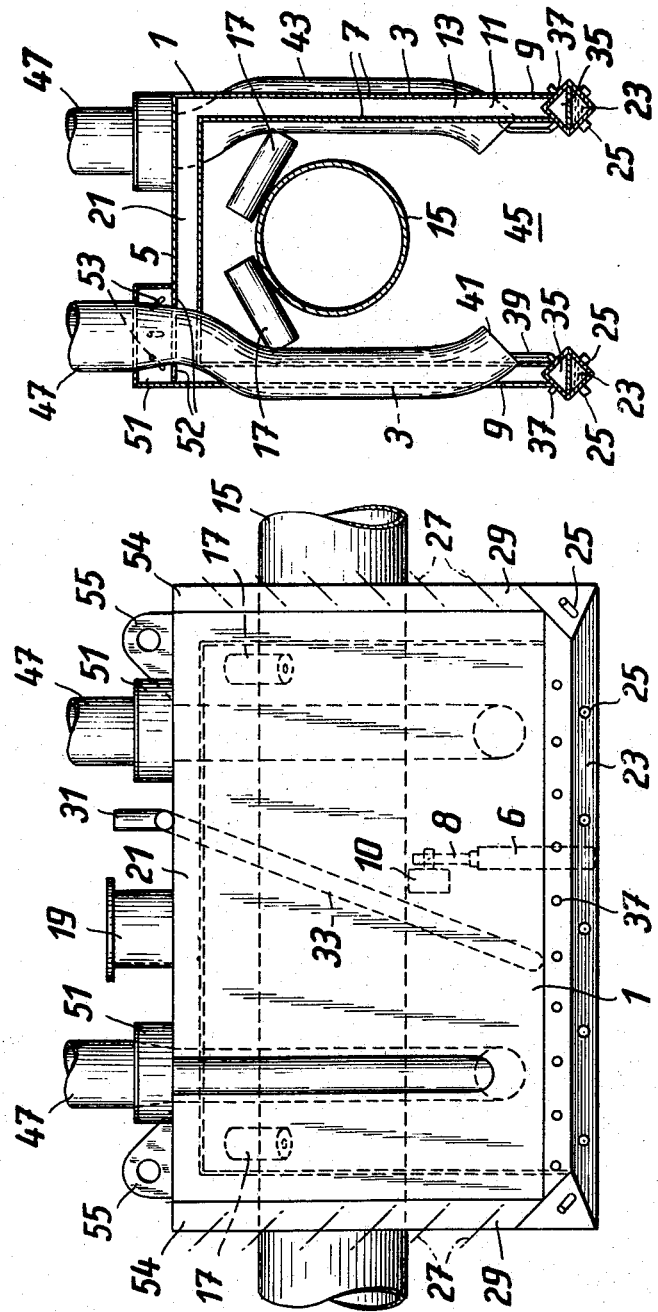

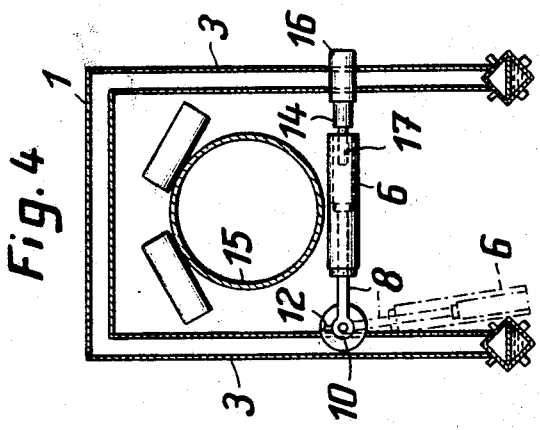
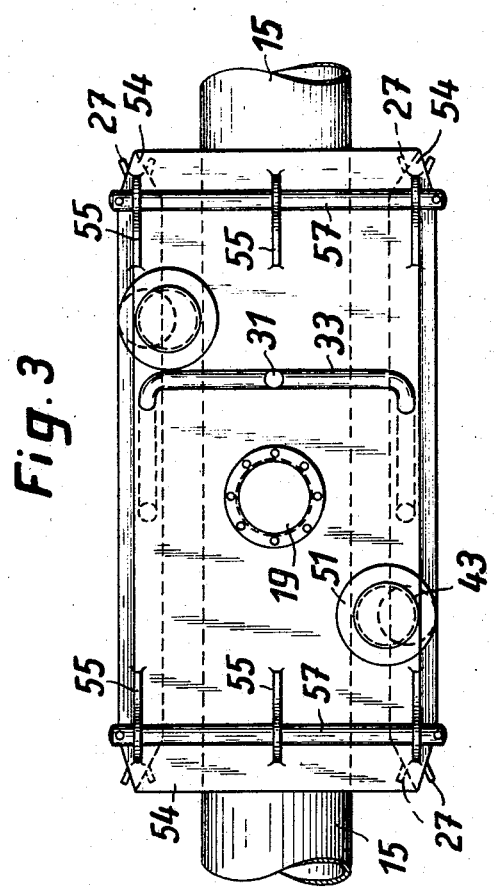
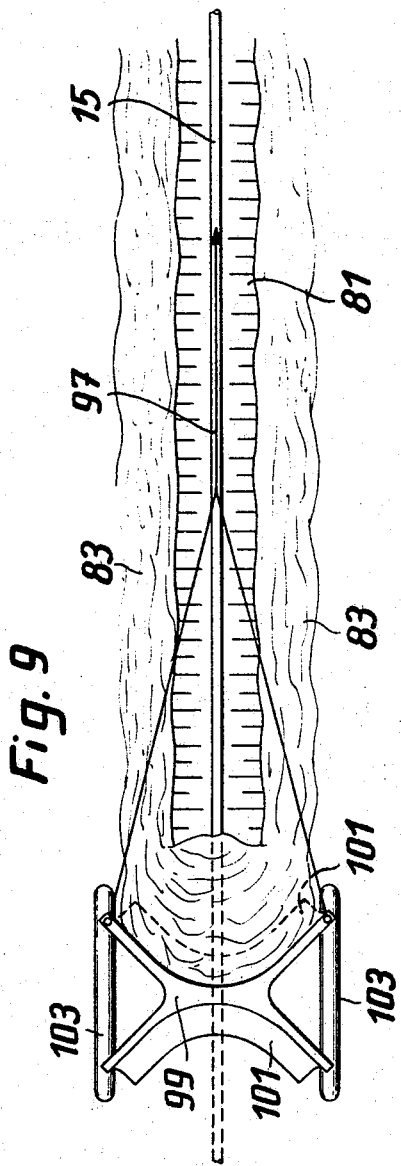

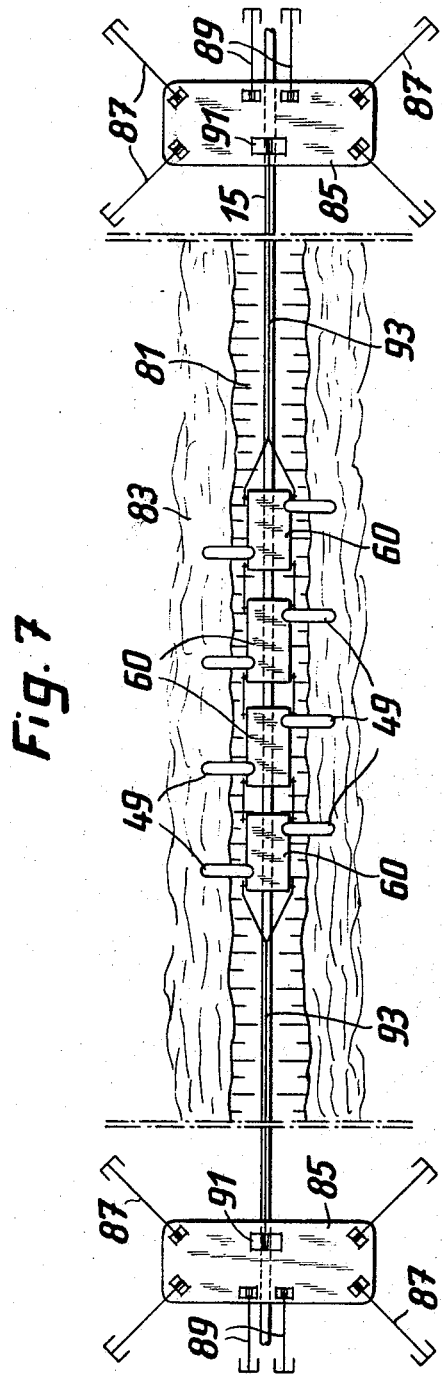
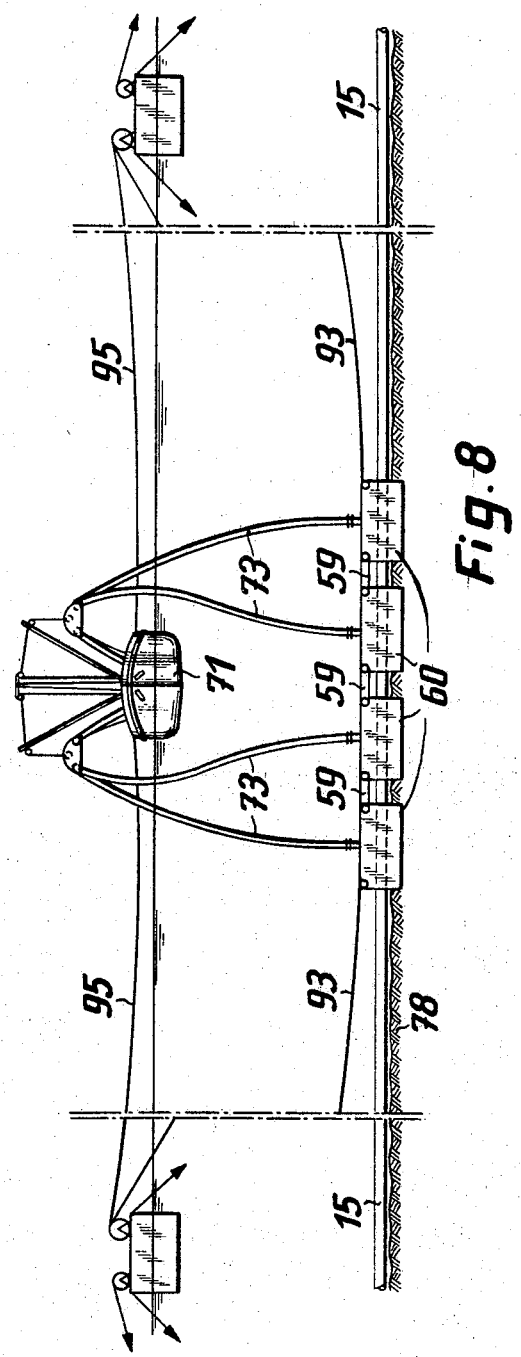

United States Patent Office 3,505,826
Patented Apr. 14, 1970

3,505,826
APPARATUS FOR EMBEDDING A PIPELINE INTO A WATER BED
Rudolf Harmstorf, Schillerstr. 45, Hamburg-Altona, Germany
Filed Feb. 28, 1968, Ser. No. 708,857
Claims priority, application Germany, Jan. 13, 1968, H 65,035
Int. Cl. F16l 1/00; E02b 5/02; E02h 3/88
U.S. Cl. 61—72.4    13 Claims

ABSTRACT OF THE DISCLOSURE

A pipeline laying on the surface of a water bed is embedded into the ground by a train of towed flushing and suction elements. The ground below the pipeline is hydraulically broken up by flushing water jets from the elements and forms suspensions which are sucked off by the elements and deposited beside the pipeline route. The pipeline sinks into the formed ditch by deflection under its weight. The ditch is backfilled by towing a shovel along the ditch. The operations are performed in sections and can be accomplished also in strong water currents.

BACKGROUND OF THE INVENTION

The field of the invention is the laying of pipelines generally and a method and apparatus for the embedding of a pipeline into the ground of a water bed, particularly.

Pipelines for the transport of liquid or gaseous media are laid over long distances onto the sea bed in order to convey said media, for example, from a boring platform to the coast. The pipelines lying freely on the bottom of the sea are endangered by the drag anchors of ships, nets dragging along the bottom, as well as undercurrents and drifting ice in shallow waters. It is therefore recommendable to embed such pipelines into the sea bed.

The embedding of such a pipeline into the sea bed, however, is encountered by the difficulty that the pipeline must be embedded in a ditch dug out or flushed out beneath it, which must be kept open during the embedding operation. The open ditch, in this operation, must be realtively long so that the pipe may deflect and place itself into the ditch.

It is the object of the invention to provide a method of and an apparatus for embedding a pipeline laid onto a sea bed.

SUMMARY OF THE INVENTION

The aforementioned object is solved in that in accordance with the invention the sea bed is broken up along and beneath said pipeline by means of liquid and gaseous media, and is thereby rendered capable of being flushed whereupon the broken up ground material capable of being flushed away is moved upwardly to above the pipeline and is deposited laterally of the pipe ditch onto the sea bed.

Using the method according to the invention, the water bed material is taken away simultaneously in several places in correspondence with the number of flushing-and-suction-elements coupled one after another, i.e. along a considerable length, so that the pipeline will deflect under its own weight and may sink into the ditch.

In accordance with a suitable embodiment of the method according to the invention, the operations of suspending the ground material, elevating it, and depositing it beside the ditch may be intensified in accordance with the desired depth of embedding by repeating the flushing operation several times, along the pipeline, in which case the sea bottom is broken up, soaked, and sucked-off by layers, and the pipeline then gradually sinks into the desired depth under the sea bottom.

If the pipe line lies in the desired embedding depth, the laterally deposited ground material may again be pushed over the pipeline thus insuring that the pipeline is covered with a sufficiently thick layer of the ground material and thus is sufficiently protected from damage. The embedding depth in the sea bed in this operation, of course, is always governed by the type of the ground material. In soft ground, a realtively greater depth may be obtained than in harder ground which are less capable of being flushed. But in spite of this, a uniform protection of the embedded pipeline will be obtained in that the pipeline will always penetrate deeper into the sea bed then an anchor dragged over the ground which too will be able to penetrate into a hard ground less deep than into a soft ground.

To carry out the method in accordance with the invention, an apparatus is utilized which is characterified by several flushing-and-sucking-elements coupled to each other and adapted to be seated on the pipeline in the form of riders and to be pulled therealong, while nozzles of the elements may eject flushing water and compressed air to the region under the pipeline. The dispersed water-and-ground mixture is sucked upwardly by means of mounted suction devices, the sucking pipes of which extend into said dispersion forming region, and deposited on both sides along the pipeline onto the sea bottom.

Utilizing the device in accordance with the invention, it is insured, at any rate, that the bottom immediately beneath a laid pipeline is removed and conveyed aside. The pipeline thus finds a cavity directly beneath itself extending over a relatively long length, into which it may sink.

In accordance with another embodiment of the device of the invention, each flushing-and-suction-element consists of a U-shaped carrier member open at the bottom and at the ends thereof and adapted to be seated on the pipeline by rotatably supported rolls. Each element has a flushing water and compressed air distribution channel extending along the carrier member end edges, said flushing water and compressed air distribution channels each being provided with outlet nozzles and being tapered at the front and rear ends thereof. In this embodiment, the flushing water nozzles are directed away from their distribution channel both downwardly as well as forwardly and rearwardly in the direction of the pipeline and may form various angles with the vertical. The compressed air nozzles, however, are directed upwardly from their distribution channel and may form various angles with the vertical. In this manner, the flushing water and compressed air disperse the ground beneath the pipeline in such a degree that it may be sucked-off upwardly by suction tubes arranged at both sides of the pipeline, which suction tubes extend downwardly along the legs of the U-shaped carrier members and are open above the distribution channel towards the region of dispersion below the pipeline. The sucked-off ground suspension may be deposited beside the pipeline. As a result of the ground material being sucked-off, below the pipeline, the flushing-and-suction-elements are sinking deeper into the sea bed, whereby an increased embedding depth of the pipeline in the ground of the waters is guaranteed. The sinking movement of the flushing-and-suction-elements deeper into the ground, in this operation, is enhanced by the compressed-air which keeps the ground material at the sides of the carrier member walls in suspension. In order to generate a sucking effect in the suction tubes, upwardly directed injection nozzles for flushing water extend into the suction tubes.

The flushing water injected in this manner into the suction tubes sucks-in the suspended ground material, and discharges it sideways. The suction effect is still enhanced additionally by the compressed air which may be introduced upwardly into the suction pipe lower ends from the compressed air distribution channels via branch lines. The upper end of the suction tubes are formed as swingable elbows so that the ground material may be deposited alternately to the right or to the left side of the pipe ditch.

In running waters, the deposition of the ground material will take place always on the downstream side in order to avoid backflow thereof into the ditch.

What is most important is the stability of the flushing-and-suction-elements. In order to secure that the legs of the carrier member always point vertically downwardly, the cavity between the walls of the legs is filled with a heavy material. The filling of the heavy material terminates below the pipeline to be embedded. The flushing-and-suction elements thus always will swing into a vertical position even if they should initially have been put on in an oblique position for one reason or another. With a water bed covered with big stones, at least one locking device may be provided in each element in order to prevent the elements from tilting completely, said locking device being capable of being pneumatically closed or opened beneath the pipeline.

Supply of flushing water and compressed air is effected via flexible lines ending on a supply vessel, the required pumping aggregates being installed on the supply vessel. With greater depths of water, electric underwater pumps may also be employed to pressurize the flushing water, the current supply from the supply vessel then being effected via cables. For towing the flushing-and-suction-elements along the pipeline, the supply vessel and the elements are drawn along the pipeline, for example, by means of a tugboat. It may also happen that the pipeline must be embedded in the region of a strong current. In such a case, the supply vessel and the flushing-and-suction elements are suitably towed along the pipeline between anchored pontoons by means of winches via towlines.

In accordance with another suitable embodiment of the invention, a plow-like towing shovel serves for backfilling the ditch in which the pipeline has been embedded. The towing shovel may be pulled over the ditch in which the pipeline was embedded, and pushes by its shares the ground material simultaneously from both sides again into the ditch.

In order to avoid reversal of the towing shovel when changing the dragging direction, separate plowshares are provided for each dragging direction. Finally, the towing shovel is still provided with slippers or skids extending in the dragging direction defining the shovel outwardly transversely of the dragging direction. With the aid of these skids or slippers, the towing shovel is prevented from being tilted.

BRIEF DESCRIPTION OF THE DRAWINGS

FIG. 1 shows a side view of a flushing-and-suction element according to the invention, FIG. 2 is a partially cross-sectional view of the element shown in FIG. 1, FIG. 3 is a top plan view taken on the element shown in FIG. 1, FIG. 4 shows the pneumatically controlled locking device of the elements, FIGS. 5 and 6 show the system of the embedding method by means of several flushing-and-suction-elements coupled in series, FIGS. 7 and 8 show the construction of the device for embedding pipelines in the bottoms of waters with strong currents, FIG. 9 shows a towing shovel for backfilling the pipeline ditch.

DESCRIPTION OF THE PREFERRED EMBODIMENTS OF THE APPARATUS

The flushing-and-suction element 1 in accordance with the invention consists of a U-shaped carrier element with two legs 3 connected by a web 5 (FIG. 2). The carrier element is double-walled with a cavity forming between the outer and inner walls 7. This cavity is filled with a heavy material, p.e. lead, in the leg ends 9. In this embodiment the filling of the legs ends at a level 13 which is still beneath the pipeline.

Rollers 17 are supported between the legs 3 of the U-shaped element 1. It is by these rollers that the element is seated on the pipeline 15 when it has penetrated deep enough into the water bed and is then drawn along the pipeline.

A locking device shown in FIG. 4 may be provided between the legs 3 of the element 1, below the pipeline 15 to be embedded, if desired or required. This locking device consists of a pivotable roller 6 the shaft 8 of which may be swung from the vertical open position into the shown horizontal closed position by means of a rotary piston 10, which can be actuated by compressed air fed into the element 1.

The angular freedom of the roller 6 is limited in the horizontal position by the stop 12. The stop 12 is connected with a control organ which effects supply of compressed air to the cylinder 16 when stop 12 is actuated; the piston 14 which is kept in its end position in the cylinder 16 by a compression spring now pushes forward. The rigid running journal 17 provided at the front end of the piston 14 moves into the bore of the roller 6 and serves as a counterbearing. The locking device now will remain closed as long as compressed air is supplied to the element and will open automatically when air supply is interrupted.

A socket 19 is fitted to the web 5 through which the pressurized water is supplied into the cavity 21 between the wall 7 of the element which cavity serves as a distributor. The pressurized flushing water flows to the distribution channels 23 which extend along the free ends 9 of the legs. The channels are equipped with a plurality of nozzles 25 through which the flushing water may flow out. The direction of flow out of the nozzles 25 is inclined downwardly with respect to the vertical by about 45°. Additional nozzles are still available in the pointed front and rear ends of the channels 29.

Another socket 31 for introducing compressed air is arranged at the web 5 between the legs 3 of the element. The compressed air from this socket 31 flows to the air channel 35 via conduits 33. These channels are extending in parallel with the flushing water channels 23 namely above them. Said compressed air channels are equipped with nozzles 37 which are directed upwardly and form an angle of about 45° with the vertical. In addition, branch lines 39 are conducted from the air channels 35 to nozzles 41 in the suction tubes 43 from which nozzles the air flows out in an upward direction.

The suction tubes 43 project into the sludge region 45 arranged above the pressure channels 23, 35, however, below the pipeline 15. From there, they extend upwardly to the pressure suction devices 51 the type and mode of operation of which are known per se.

Short sockets 47 are mounted on the suction devices 51 as connecting sockets for the swingable elbows 49. The pressurized water necessary to operate the suction devices enters through openings 52 from the cavity 21 into the annular space of the suction device. A suction effect is generated by means of water jets flowing out of upwardly directed nozzles 53 fitted in the divergent diffuser of the suction device. The suspended ground material is sucked-in by said suction effect from the region 45 and conveyed upwardly.

Ears 55 are provided at the ends of the element 1 with rods 57 pushed therethrough (FIG. 3), these rods 57 serve to connect the individual elements which may be effected, for example, with connecting rods 59. Towing hawsers 61, 63 are fastened at the ends of the element train 60.

DESCRIPTION OF THE PREFERRED EMBODIMENTS OF THE METHOD

The embedding method first begins with locating the laid pipe line to be embedded. his may be carried out in various known manners and therefore will not be explained in more detail. Then marking buoys 75 are set on both sides of the located route of the line (FIGS. 5 and 6). The first element of the train of elements 60 is connected with a tugboat 67 by means of the towing hawsers 61 (FIG. 5). The supply vessel 71 deposits the train of the elements 60 onto the waters ground by means of a derrick 69 in such a manner that it stands above the pipeline 15 to be embedded in a correct position, with respect to the line route. With low depths of water the correct position of the train 60 with respect to the pipeline route may be controlled by a diver and with greater depths by means of an underwater television camera. The energy supply lines 73 have already been fastened at the elements before submerging them and are now extended during the sinking in correspondence with the depth to which the elements are to be sunk. The elbows 49 also have been previously arranged so that the conveyed ground material may be discharged laterally of the pipeline ditch and deposited there. For marking the position of the train of elements 60, marking buoys 75 are still provided at the beginning and of the end of the train which allow for control from the surface of the water and thus provide for a possibility to make corrections which may become necessary.

After completion of this preparatory work, a communication is established between the tugboat 67 and the supply vessel 71 by means of a tow line 77. At the beginning of the operation of embedding the pipeline 15 in the sea bed 78 pressurized water and flushing compressed air are supplied to the train of elements. The strong water jets from the nozzles 25, 27 tear open the ground and soak it. The compressed air flowing out of the air nozzles 37 enhances the suspension of the ground particles and takes upwardly with it part of the loosened ground material and thus prevent jacket friction of the train on its onward move particularly in the region of the leg outer walls 7.

The suction devices 51 then suck-off the ground material, the elements sink into the ground and seat themselves onto the pipeline 15 by the obliquely arranged rollers 17. Immediately after this operation is finished, the tugboat 67 begins to tow the train 60 and the supply vessel along the pipeline. If the desired depth of embedding is not obtained by one passage the corresponding route section must be run through once again.

For this purpose, the tow lines (strong wire lines) 61 and 77 are returned to the supply vessel 71 from the tugboat 67; the tugboat 67 then takes over the tow lines 63 and 79 shown in FIG. 6. It is by means of these tow lines that the tugboat 67 pulls the train of elements 60 again back into the starting position. This working cycle may be carried out repeatedly until the pipeline 15 is sunk to the desired depth in all its sections.

As will be seen from FIGS. 6 and 7 the pipeline 15 is then embedded in the ditch 81. On both sides of the ditch 81, there are heaps 83 of ground material which was heaped up after leaving the elbows 49.

The embedding method shown in FIGS. 5 and 6 is not suitable when the pipeline to be embedded is disposed in the region of a strong water current. In this case, the operation is carried out in correspondence with a method represented in FIGS. 7 and 8. In this method one works with the aid of two pontoons which are anchored at their positions by means of heavy anchors 87 and 89. The anchors 89 intercept the forces acting on the pontoons when tripping with the winches 91, said anchors 89 being dropped into the towing direction of the train of elements.

With this embedding method, the train of elements 60 is retained between the winches 91 by means of the towing lines 93. The connection between the pontoons 85 and the supply vessel 71 is effected by means of towing ropes 95. A displacement caused perhaps by the current may be prevented with the aid of the winches on the pontoons by means of suited counteractions. The operation is carried out along the overall length of the line route by changing the positions of the pontoons so that subsequent overlapping sections of the route may be run through by the train 60.

Once the pipeline 15 has been embedred sufficiently deep in the bottom of the water 78 on its entire length, the train of elements 60 is taken aboard by the supply vessel 71. Then a towing shovel 99 is pulled over the ditch along the line route either by the tugboat 67 or the winches 91 of the pontoons 85 by means of a tow line 97 (FIG. 9) This towing shovel 99 is equipped with plowshares 101 which move the ground material compiled in heaps 83 on both sides, into the ditch simultaneously from both sides. The plowshares 101, in this arrangement, are provided to be effective in both towing directions so that the towing shovel may work without difficulties in both directions. Finally the towing shovel is still provided with lateral skids or slippers 103 preventing the towing shovel from possibly being toppled over. After the towing shovel has been pulled over the ditch once or several times, the ditch 81 will be backfilled and the embedded pipelines thus secured by a sufficient ground cover.

What I claim is:
1. An apparatus for embedding a pipeline into a waters ground comprising
   carrier means adapted to be seated upon the pipeline, flushing water distribution means disposed at said carrier means and adapted to spray water jets onto the ground to be broken up below the pipeline, said distribution means being connected to a flushing water pump, open tubes arranged substantially vertically at said carrier means the one ends of said tubes being disposed near said distribution means and being open towards the broken up ground below the pipeline, said tubes being bent off transversely above said carrier means with their other ends being arranged beside the pipeline route, suction means provided in said tubes adapted to suck-off the ground sludge from below the pipeline into said tubes in which the sludge is conveyed to places beside the pipeline route,
   compressed air distribution means disposed at said carrier means and adapted to blow air into the surroundings of said carrier means and
   a plow-like towing shovel with shares formed in order to shove the deposited ground from both sides of the pipeline ditch back thereinto when being drawn along the pipeline route,
2. An apparatus in accordance with claim 1, wherein the towing shovel is provided with a share for each of both opposite towing directions.
3. An apparatus in accordance with claim 1, wherein the towing shovel is provided with two skids mounted on both sides thereof and extending in the towing direction.
4. An apparatus for embedding a pipeline within a water bed which has previously been laid on the water bed comprising, in combination, carrier means having forward and rearward ends and of inverted U-shaped cross sectional configuration defining a web and legs straddling said pipeline, pairs of rollers mounted adjacent the web of said carrier means between its legs in spaced relation at the forward and rearward ends of said carrier means having their axes upwardly inclined toward the central region of said carrier means and adapted to ride on said pipeline, flushing water distributing means connected to a pressurized water source including ducts extending along the edges of the legs of said carrier means provided with nozzles directing water jets obliquely downwardly at different angles with respect to the vertical as well as forwardly and rearwardly in the direction of movement of said carrier means, compressed air distributing means connected to a compressed air source including ducts extending along the edges of the legs of said carrier means provided with nozzles directing compressed air jets obliquely upwardly at different angles with respect to the vertical, open ended suction pipes arranged on said carrier means including downwardly extending sections terminating with their open ends adjacent the lower edge of said carrier legs and upwardly extending sections inclined laterally outwardly with respect to said carrier means, and an injector pump communicating with said water distributing ducts arranged intermediate the ends of said suction pipes forcing the sucked-in sludge upwardly therethrough and discharging it at either side of the thus formed ditch within which said pipeline is embedded.

5. An apparatus according to claim 4, wherein said carrier means comprises inner and outer walls spaced relative to each other and connected along the edges of said legs by said water distributing ducts thereby defining a hollow space communicating with said water distributing ducts and said injector pump and servng as a header for the pressurized water, said air distributing ducts extending in parallel relation to said water distributing ducts along the lower ends of said legs directly above said water distributing ducts and communicating via branch pipes with nozzles directing jets of compressed air into the inlet openings of said suction pipes.

6. An apparatus in accordance with claim 4, wherein a compressed air controlled locking device is provided between the carrier means legs below the pipeline, said locking device comprising a roller swingably mounted at one leg and a fluid pressure operated piston motor arranged at the other leg and adapted to engage and lock the swung out roller in the horizontal position.

7. An apparatus according to claim 4, wherein a plow-like towing shovel is connected by traction means to the rearward end of said carrier including shares shoving the ground deposited along either side of said pipeline ditch back into the ditch when moved therealong.

8. An apparatus in accordance with claim 7, wherein the towing shovel is provided with a share for each towing direction.

9. An apparatus in accordance with claim 7, wherein the towing shovel is provided with two skids mounted on both sides thereof and extending in the towing direction.

10. An apparatus for embedding a pipeline within a water bed comprising, in combination, a plurality of carrier means joined together to form train and adapted to be seated on the pipeline, flushing water distributing means mounted on each carrier means and adapted to direct jets of water to the ground to be broken up below the pipeline, open ended tubes including lower sections arranged substantially vertically on each of said carrier means with their lower openings arranged adjacent said water distributing means and upper inclined sections extending above said carrier means in directions away from said pipeline, injector means provided in each of said tubes adapted to suck the ground sludge from below the pipeline into said tubes and to discharge the sludge at either side of said pipeline, compressed air distributing means mounted on each of said carrier means and adapted to blow air into the surroundings thereof, and a supply ship carrying flushing water and compressed air pumps connected by means of flexible ducts to said flushing water and said compressed air distribution means, respectively, of each of said carrier means, said train of carrier elements and said supply ship being towed along the pipeline route.

11. An apparatus according to claim 10, wherein a plow-like towing shovel is connected by traction means to the last one of said train of carrier means including shares shoving the ground deposited at either side of said pipeline back to cover said pipeline when moved therealong.

12. An apparatus in accordance with claim 10, wherein said train of carrier elements and said supply ship are towed along the pipeline by a tug.

13. An apparatus in accordance with claim 10, wherein a pontoon provided with a winch is anchored at each end of a pipeline section, said train of carrier elements and said supply ship being towed back and forth along said pipeline section by means of the winches on said pontoons.

References Cited

UNITED STATES PATENTS

| 1,415,113 | 5/1922 | Phillips | 37—63 X |
|---|---|---|---|
| 2,602,300 | 7/1952 | Collins | 61—72.4 |
| 2,906,040 | 9/1959 | Hefling | 37—62 |
| 3,103,790 | 9/1963 | Popich | 61—72.4 |
| 3,368,358 | 2/1968 | Elliott | 61—72.4 |
| 3,429,132 | 2/1969 | Martin | 61—72.4 |

JONOB SHAPIRO, Primary Examiner

U.S. Cl. X.R.

37—63